US007671835B2

(12) United States Patent
Suwabe et al.

(10) Patent No.: US 7,671,835 B2

(45) Date of Patent: Mar. 2, 2010

(54) IMAGE DISPLAY APPARATUS AND IMAGE DISPLAY METHOD

(75) Inventors: Yasufumi Suwabe, Ashigarakami-gun (JP); Yoshiro Yamaguchi, Ashigarakami-gun (JP); Yoshinori Machida, Ashigarakami-gun (JP); Motohiko Sakamaki, Ashigarakami-gun (JP); Takeshi Matsunaga, Ashigarakami-gun (JP); Atsushi Hirano, Ashigarakami-gun (JP); Kiyoshi Shigehiro, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 799 days.

(21) Appl. No.: 11/399,525

(22) Filed: Apr. 7, 2006

(65) Prior Publication Data

US 2007/0047003 A1 Mar. 1, 2007

(30) Foreign Application Priority Data

Aug. 26, 2005 (JP) ............................ 2005-246526

(51) Int. Cl.
*G09G 3/34* (2006.01)
*G02B 26/00* (2006.01)

(52) U.S. Cl. ...................................... 345/107; 359/296

(58) Field of Classification Search ................ 345/107; 359/296
See application file for complete search history.

(56) References Cited

U.S. PATENT DOCUMENTS

2004/0145696 A1 * 7/2004 Oue et al. .................. 349/167

FOREIGN PATENT DOCUMENTS

JP A 2003-005277 1/2003

* cited by examiner

*Primary Examiner*—Amr Awad
*Assistant Examiner*—Jonathan Boyd
(74) *Attorney, Agent, or Firm*—Oliff & Berridge, PLC

(57) ABSTRACT

In an image display apparatus and image display method suppress the degradation of display function and the shortening of service life due to long-term use, measurement of a current value is carried out and the measured current value each time a certain time elapses is stored. The integrated value of the current is calculated, and a comparator compares the integrated value with a reference value stored in a storage section for determining whether or not the result is greater than a prescribed value. If the result is affirmed to differ by prescribed value, a recovery voltage is applied, and it is determined whether or not a recovery time has exceeded a stored recovery time. If the excedance of the recovery time is affirmed, the application of the recovery voltage is terminated. If a negation is given at the determination of the greater difference value, the flow is ended. If a negation is given at the determination of the recovery time, the recovery voltage is applied.

13 Claims, 13 Drawing Sheets

IMAGE DISPLAY APPARATUS AND IMAGE DISPLAY METHOD

CROSS-REFERENCE TO RELATED APPLICATION

This application claims priority under 35 USC 119 from Japanese Patent Application No. 2005-246526, the disclosure of which is incorporated by reference herein.

BACKGROUND OF THE INVENTION

1. Technical Field

The present invention pertains to an image display apparatus, and an image display method carried out in the image display apparatus, and particularly, relates to an image display apparatus which, on the basis of image data, applies a prescribed image display voltage between a pair of electrodes, at least one of which is composed of a transparent electrode, thereby moving particles enclosed between the electrodes to carry out image display by the particles arranged on the transparent electrode side, and an image display method in the image display apparatus.

2. Description of the Related Art

Conventionally, an image display apparatus has been proposed in which, particles colored, for example, black are enclosed, between two substrates at least one of which is transparent, and which are opposed to each other with a prescribed spacing, and the particles are friction-charged, whereby the particles between the substrates are moved to display an image.

At the initial stage of the period of use of the image display apparatus, the particles can be friction-charged by stirring by applying a vibration from the outside, causing particle movement by voltage application, applying a charge from the outside, or the like, to bring the particles into a prescribed charged state.

However, in an image display apparatus having a configuration as described above, repetition of display over a long period of time, continuous operation for many hours, and an environmental change (a change in temperature, humidity, or atmospheric pressure) lowers the electric-chargeability possessed by the particles, resulting in the quantity of charge being decreased. In such a situation, there arises a problem in that application of a predetermined image display voltage alone will not provide a sufficient display contrast, resulting in the display function being degraded.

In addition, if the quantity of charge of the particles is reduced, movement of the particles becomes difficult, which may result in a display defect being produced. Further, there may occur a state in which the number of particles which do not contribute to the display is increased, resulting from adherence of particles to the partition wall in the substrate, aggregation of particles, and the like. In such a case as well, there arises a problem in that a sufficient display contrast cannot be obtained.

In order to eliminate the above-mentioned problems, application of an alternating voltage has been proposed in order to achieve purposes, such as causing the particles to rub against one another to apply charges to them, vibrating the aggregated particles to separate them and return them to the individually movable state, and the like. For example, in Japanese Patent Application Laid-Open No. 2003-5277, a technique which renders the particles uniform by applying an alternating voltage, which is different from the image display voltage, to the particles dropping in the direction of gravity is described.

However, experiments have revealed that, depending upon the application conditions (such as the timing of application, the application time period, and the like), the quantity of charge of the particles may not be restored, and can be expected that there will be case where, even if the above-mentioned conventional art is used, the display quality which has been degraded by repetition of display, an environmental change, or the like, may not be restored to a state which is equivalent to that at the initial stage in the period of use.

In addition, in a case where the image display voltage which was set at the initial stage in the period of use no longer moves the particles, and a high voltage is applied as the image display voltage, an overcharge is then caused, resulting in even the pixels for which no write is to be performed being influenced by the application of the image display voltage. Due to this influence, a problem is caused such as in that, when black is to be displayed on the white background, for example, fogging occurs on the white background. In addition, application of too high a voltage presents a problem in that the service life of the image display apparatus itself is shortened.

SUMMARY OF THE INVENTION

In view of the above-described situation, an image display apparatus in which degradation of the display function being degraded due to operation over a long period of time can be prevented, and shortening of the service life of the image display apparatus can also be prevented, and an image display method carried out in the image display apparatus have been demanded.

A first aspect of the present invention provides an image display apparatus which, on the basis of image data, applies a prescribed image display voltage between a pair of electrodes at least one of which is composed of a transparent electrode, thereby moving particles encapsulated between the electrodes for carrying out image display by the particles arranged on the transparent electrode side, comprising a recovery section which recovers a reduction in quantity of charge of the particles to a prescribed quantity, and an ending section which ends the recovery by the recovery section when the quantity of charge of the particles has reached a prescribed quantity.

A second aspect of the present invention provides an image display method in an image display apparatus which, on the basis of image data, applies a prescribed image display voltage between a pair of electrodes, at least one of which is composed of a transparent electrode, thereby moving particles enclosed between the electrodes to carry out image display by the particles arranged on the transparent electrode side. The method includes recovering a reduction in quantity of charge of the particles to a prescribed quantity and ending the recovery when a prescribed period of time is exceeded.

A third aspect of the present invention provides an image display method in an image display apparatus which, on the basis of image data, applies a prescribed image display voltage between a pair of electrodes, at least one of which is composed of a transparent electrode, thereby moving particles enclosed between the electrodes to carry out image display by the particles arranged on the transparent electrode side. The method includes recovering a reduction in quantity of charge of the particles to a prescribed quantity by a recovery operation for a prescribed period of unit time that is repeated until a predetermined condition is met and ending the recovering when the quantity of charge of the particles has reached a prescribed quantity.

BRIEF DESCRIPTION OF THE DRAWINGS

Embodiments of the present invention will be described in detail based on the following figures, wherein.

DETAILED DESCRIPTION OF THE INVENTION

First Embodiment

FIG. 1 to FIG. 3B show an image display medium 12 pertaining to a first embodiment.

Figure 1:
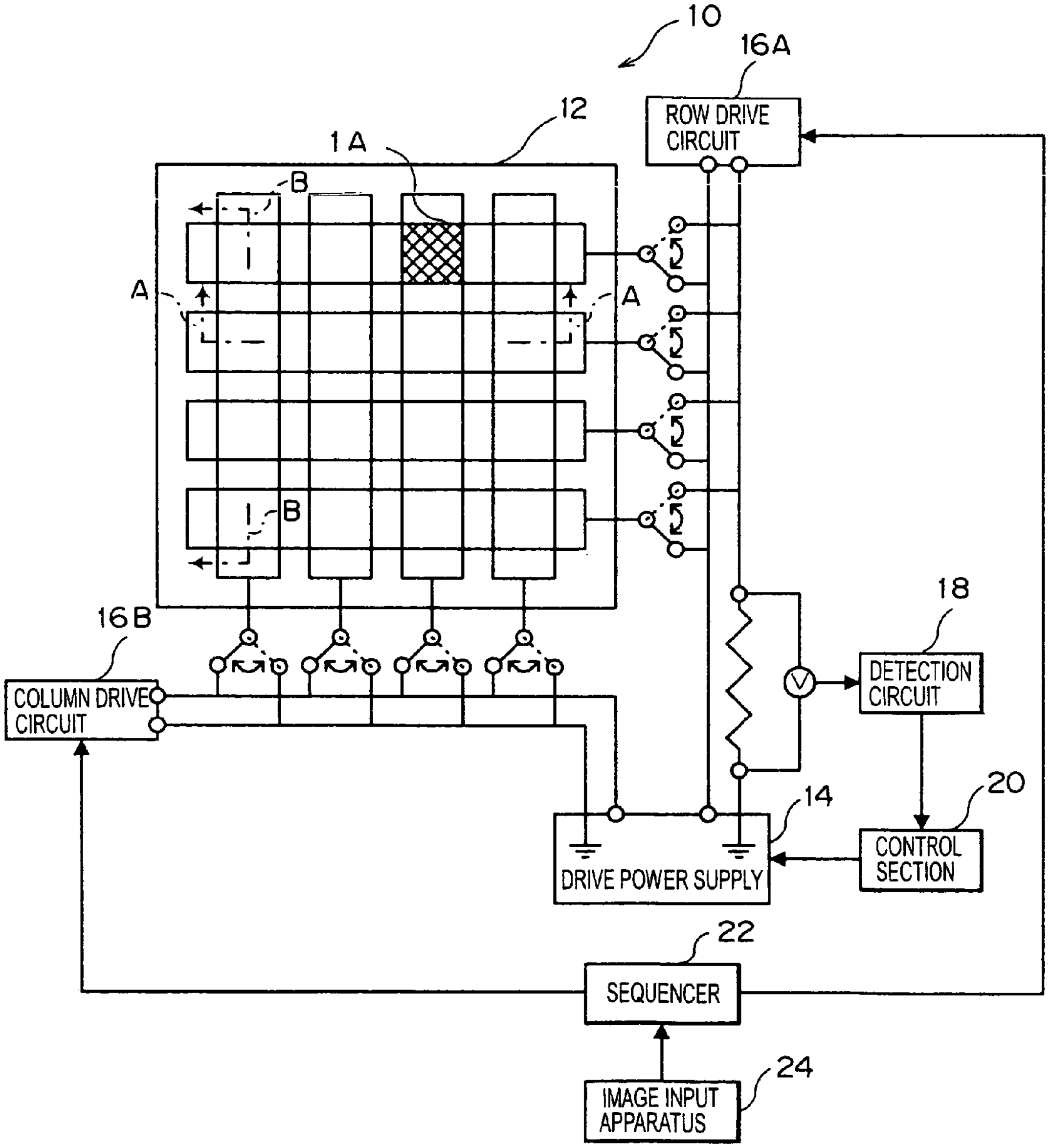
FIG. 1 is an explanatory drawing of an image display apparatus pertaining to a first embodiment.

Shown in FIG. 1, an image display apparatus 10 comprises the image display medium 12, and a drive circuit 16A, 16B which drives the image display medium 12.

The image display medium 12 is connected to the drive circuit 16A, 16B. Specifically, a column electrode 30B of a display substrate 26 and a row electrode 30A of a back substrate 28 are connected to the column drive circuit 16B and the row drive circuit 16A, respectively, and the column drive circuit 16B and the row drive circuit 16A are connected to a sequencer 22 and a drive power supply 14.

The sequencer 22 is connected to an image input section 24, and according to arbitrary image information inputted from the image input section 24, outputs an image information signal to the column drive circuit 16B and the row drive circuit 16A, and controls the timing for voltage application.

In addition, the image display apparatus 10 comprises a detection circuit 18 which detects a current flowing from the drive power supply 14, and a control section 20 which carries out controlling the voltage to be applied to respective display pixels on the basis of the current detected.

The image display medium 12 in the first embodiment is driven by the simple matrix driving method. Theoretically, the present invention is applicable to the active matrix driving method, however, hereinbelow, the first embodiment will be described according to the simple matrix driving method.

Figure 3A:
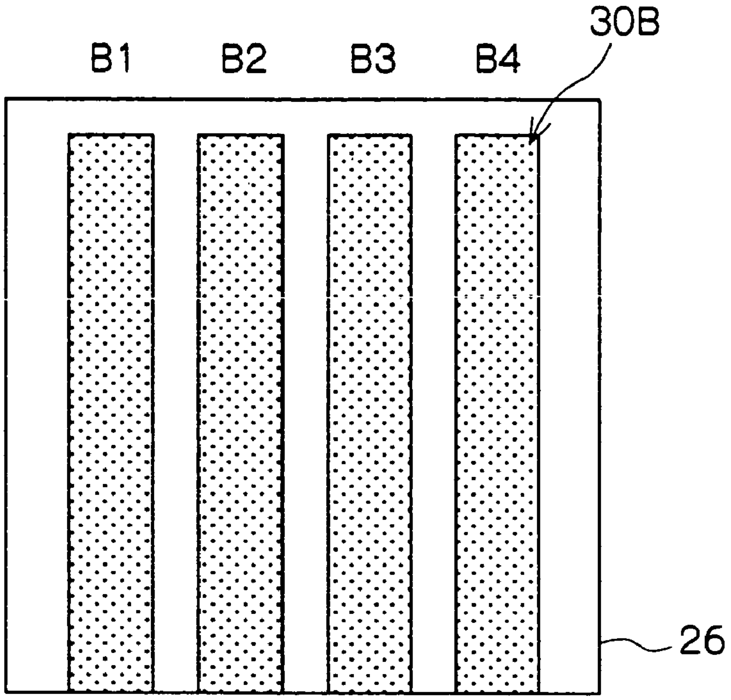
FIG. 3A is a sectional view taken along line A-A in FIG. 1.
Figure 3B:
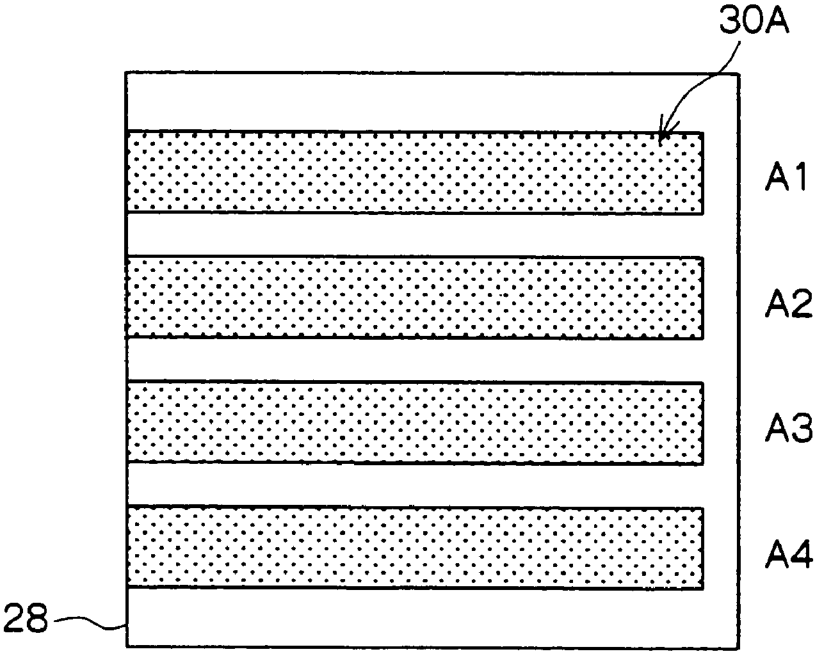
FIG. 3B is a sectional view taken along line B-B in FIG. 1.

Shown in FIG. 3A, in the image display medium 12, plural linear electrodes 30B (hereinafter called "column electrodes") are provided on the opposing surface of the display substrate 26 facing the back substrate 28, and likewise, shown in FIG. 3B, plural linear electrodes 30A (hereinafter called "row electrodes") are also provided on the opposing surface of the back substrate 28 facing of the display substrate 26. Further, the display substrate 26 and the back substrate 28 are disposed, facing each other, such that the column electrodes 30B and the row electrodes 30A provided in the display substrate 26 and the back substrate 28, respectively, are cross each other. The display substrate 26 is transparent.

In simple matrix driving, an image writing signal (a scanning signal) for each row is fed from the sequencer 22 to the row drive circuit 16A, and from the row drive circuit 16A, an image writing voltage is sequentially applied to each row electrode 30A in the back substrate 28. At the same time, in synchronization with the application of the image writing voltage to each row electrode 30A in the back substrate 28, an image information signal corresponding to the row to which the image writing voltage is applied is fed from the sequencer 22 to the column drive circuit 16B, and from the column drive circuit 16B, an image writing voltage corresponding to the write row is applied to the respective column electrodes 30B in the display substrate 26 at a time. Such operation is sequentially performed from the first row to the last row to display a desired image.

In addition, between the display substrate 26 and the back substrate 28, positively charged black particles 32 and negatively charged white particles 34 are enclosed; these two types of particle being mutually different in charging characteristic.

Figure 2A:
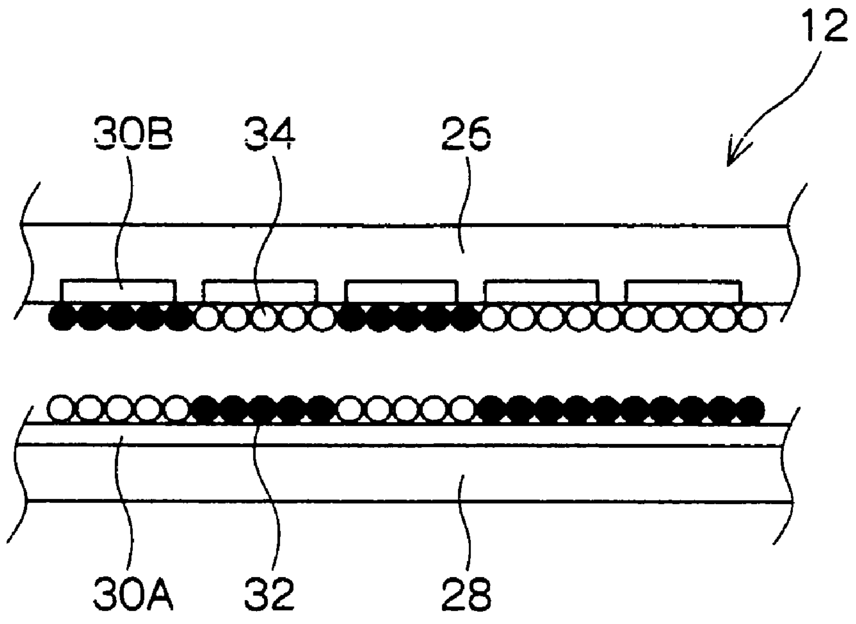
FIG. 2A is a front view of a display substrate of an image display medium pertaining to the first embodiment.
Figure 2B:
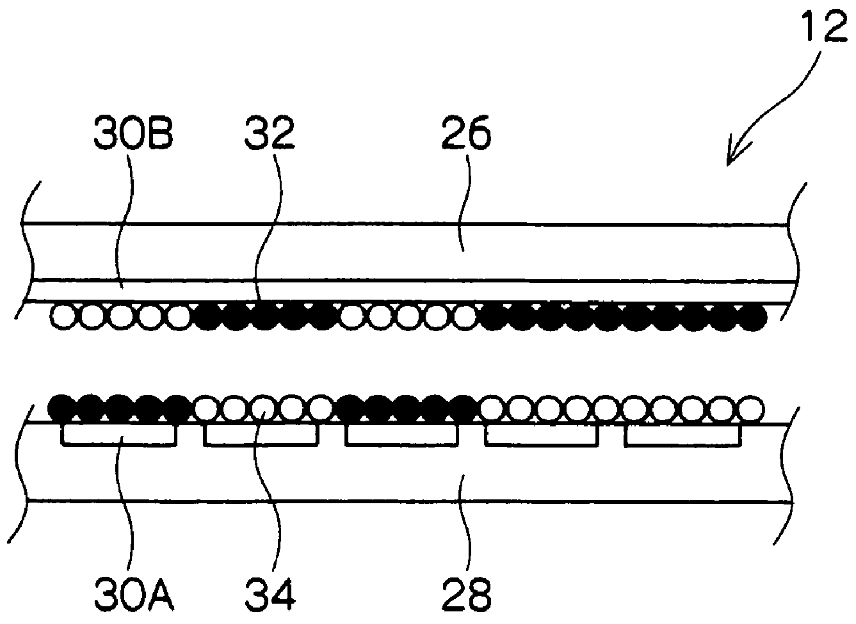
FIG. 2B is a front view of a back substrate of an image display medium pertaining to the first embodiment.

Further, FIG. 2A is a sectional view taken along line A-A in FIG. 1, and FIG. 2B is a sectional view taken along line B-B in FIG. 1.

In the first embodiment, for simplification of description, a simple matrix configuration of 4 by 4 is used; the four column electrodes 30B in the display substrate 26 are designated B1, B2, B3, and B4, respectively; and the four column electrodes 30A in the back substrate 28 are designated A1, A2, A3, and A4, respectively in fact, needless to say, electrodes, the number of which corresponds to that of horizontal and vertical pixels required for image display, are formed in the respective substrates. In addition, the first embodiment is configured such that the linear electrodes in the display substrate 26 provide the column electrodes, while the linear electrodes in the back substrate 28 provide the row electrodes. However, contrarily to this, the row electrodes are provided in the display substrate 26, while the column electrodes may be provided in the back substrate 28. The particles are nonconductive particles.

Next, with reference to FIG. 4, the functional configuration of the image display medium 12 pertaining to the first embodiment will be described.

The drive power supply 14 comprises an image display voltage application section 36 which applies an image display voltage for causing the image display medium 12 to display an image. The image display voltage application section 36 is controlled by image display voltage application control means (not shown).

Herein, the procedure for applying an image display voltage by the image display voltage application section 36 will be described.

The image display voltage application section 36 provides two different voltage application modes, i.e., the initialization mode in which voltage application for initializing the entire surface is performed, and the write mode in which application of an image display voltage in accordance with the image information is performed.

In the configuration of the first embodiment, a force adhering the particles to the surface of the display substrate 26 or the back substrate 28 (an adherence force) is generated due to the static electricity possessed by the particles themselves, intermolecular forces, such as the Van der Waals force, and the like, and thus even if a voltage is applied between the display substrate 26 and the back substrate 28, the particles will not be moved until a certain field strength is provided (the threshold voltage is applied). Depending upon the distance between the display substrate 26 and the back substrate 28, the strength of the electric field can be controlled by changing the application voltage. (Herein, the threshold voltage refers to the voltage at which the black particles 32 or the white particles 34 which have been adhered to the surface of the row electrode 30A or the column electrode 30B start to move toward the display substrate 26 or the back substrate 28 side.)

Figure 5A:
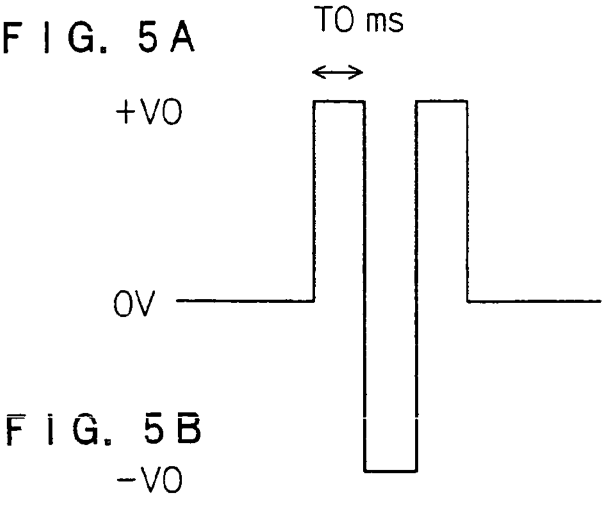
FIG. 5A illustrates the substrate potential of a front electrode in a initialization mode.
Figure 5B:
FIG. 5B illustrates the substrate potential of a back electrode in the initialization mode.

Voltage application for initialization in the ordinary state (the state at the initial stage of shipment) in which no display degradation has occurred is carried out, shown in FIG. 5A and FIG. 5B, by applying a pulse of ±V0 V, T0 ms to the column electrodes 30B on the display substrate 26 side once to a few times, with the electrodes on the back substrate side being set at ground potential, such that the polarity at which the display substrate 26 side is fully covered with white particles (in other words, the entire surface performs white display) is provided.

Figure 5C:
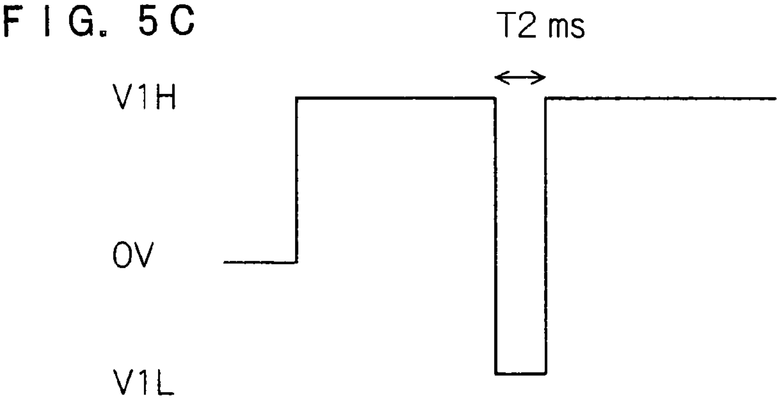
FIG. 5C illustrates the substrate potential of the front electrode in a write mode.
Figure 5D:
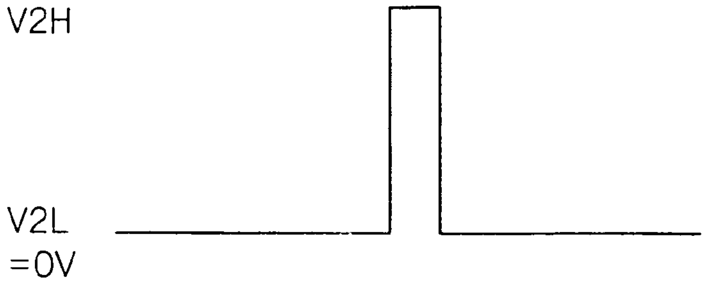
FIG. 5D illustrates the substrate potential of the back electrode in the write mode.

In image display, an image display voltage is applied, but, in the application start state, shown in FIG. 5C and FIG. 5D, all the column electrodes 30B on the display substrate 26 side (the image data application side) are set at V1H V, while the row electrodes 30A on the back substrate 28 side are set at V2L V. In this state, the voltage between the display substrate 26 side and the back substrate 28 side is equal to or less than the threshold voltage VT V shown in the following equation (1), and no particles are moved.

$$|V1H-V2L|\leqq VT \quad (1)$$

In addition, even if the following equation (2) or (3) is met, no particles will be moved.

$$|V1H-V2H|\leqq VT \quad (2)$$

$$|V2L-V1L|\leqq VT \quad (3)$$

In the first embodiment, the row electrodes 30A on the back substrate 28 surface are sequentially switched to V2H V for a time period of T2 ms in the order of A1, A2, A3, and A4. Then, in synchronization to the scanning, the voltage for a part of the column electrodes (the data electrodes) 30B on the display substrate 26 side, for which image data is on and which have been selected in accordance with the image data for writing, is changed to V1L V. The relationship among V2H, V1L, and VT at this time is expressed by the following equation (4).

$$|V2H-V1L|>VT \quad (4)$$

When only a certain selected pixel, for example, pixel 1A shown in FIG. 1, is to display black, only the voltage relationship for the pixel 1A is rendered to be that such as expressed by the above-mentioned equation (4). Then, the particles on the back substrate 28 side are moved to the display substrate 26 side to display black on the white display substrate 26.

The application parameters to be adjusted in the initialization mode are the pulse voltage V0, and the number of pulses N0, and those in the write mode are the pulse voltage (V2H–V1L), the pulse width T2, and the number of pulses N2. Further, by adjusting the parameters, the effects as given in Table 1 below can be obtained.

TABLE 1

| | Initialization mode | | | Write mode | | |
|---|---|---|---|---|---|---|
| | Pulse voltage V0 | Pulse width T0 | Number of pulses N0 | Pulse voltage (V2H(V1L) | Pulse width T2 | Number of pulses N2 |
| When qty of charge is lowered | Increase V0 | — | Increase N0 | Increase (V2H(V1L) | Increase T2 | Increase N2. |
| When qty of charge is increased | Decrease V0 | — | Decrease N0 (Minimum is 1) | Decrease (V2H(V1L) | Decrease T2 | Decrease N2. (Minimum is 1.) |
| Effects | The higher V0 is the higher the strength of the electric field acting on the particles is. Therefore, a sufficient number of particles are moved in a shorter period of time, with display contrast being improved (white density decreased). | | The greater the number of pulses is, the smaller the amount of particles which are left as they are in the previous display state of being adhered on the substrate surface is, and the greater the number of particles which contribute to display is. Therefore, a sufficient number of particles are moved in a shorter period of time, with display contrast being improved (white density decreased). | The greater the potential difference is, the higher the strength of the electric field acting on the particles is. Therefore, a sufficient number of particles are moved in a shorter period of time, with display contrast being improved. However, too great a potential difference will move particles for pixels that have not been selected (fogging will be produced). | The longer the pulse duration is, the longer the application time period for the electric field acting on the particles is. Therefore, even with a low voltage, a sufficient number of particles are moved, with display contrast being improved. However, too great pulse width will cause fogging, and a problem such that the time period required for writing is lengthened. | If pixels that have not been selected are fogged, is shortened the time period for applying the high voltage. By repeating the pulse whose time period for application is shortened, the display density can be increased. |

Figure 6:
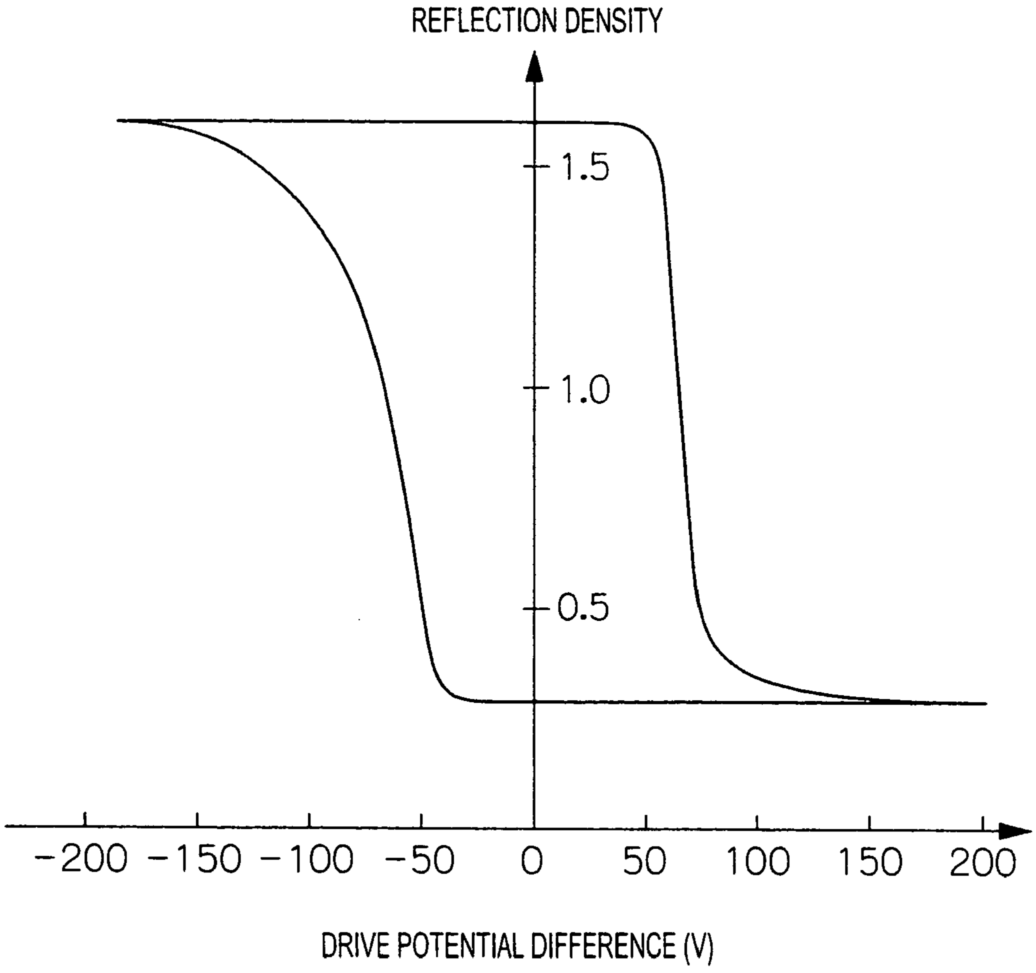
FIG. 6 is a drawing illustrating the relationship between the difference in potential applied between the opposing electrodes and the display density in the image display medium.

Next, FIG. 6 illustrates the relationship between the drive potential difference and the display density (the reflection density) in the image display medium 12. Herein, the drive potential difference is the voltage applied to the column electrode 30B in the display substrate 26 subtracted by the voltage applied to the row electrode 30A in the back substrate 28. In addition, the display density is a measurement obtained by means of a reflection densitometer (X-Rite 404A manufactured by X-Rite Co.). The values of display density which are given hereinafter are all measurements obtained by use of the same reflection densitometer.

Hereinbelow, a case where the threshold voltage for the particles is VT V (for example, VT=40 V) will be described.

The graph shown in FIG. 6 was obtained by taking the procedure which will described below.

First, all the row electrodes 30A in the back substrate 28 were set at a definite value of 0 V, and a voltage of +200 V was applied to all the column electrodes 30B in the display substrate 26 for causing the display surface of the display substrate 26 to display white over the entire surface. Then, a negative pulse voltage was applied to all the column electrodes 30B in the display substrate 26 for 10 msec, and the display density was measured with the reflection densitometer. Thereafter, to the electrodes in the display substrate 26, a voltage of −200 V was again applied for 30 msec for rendering the display surface of the display substrate 26 white again, and then, while the value of the negative pulse voltage applied was gradually changed, the above-mentioned procedure was repeated.

Likewise, to all the column electrodes 30B in the display substrate 26, a voltage of −200 V was applied for causing the display surface of the display substrate 26 to display black over the entire surface. Then, a positive pulse voltage was applied to all the column electrodes 30B in the display substrate 26 for 10 msec, and the display density was measured with the reflection densitometer. Thereafter, to the electrodes in the display substrate 26, a voltage of −200 V was again applied for 30 msec for rendering the display surface of the display substrate 26 black again, and then, while the value of the positive pulse voltage applied was gradually changed, the above-mentioned procedure was repeated.

As can be seen from the content illustrated in FIG. 6, when the white surface of the display substrate 26 is to be caused to display black, no black display is carried out until the potential difference between the column electrode 30B in the display substrate 26 and the row electrode 30A in the opposing back substrate 28 is +40 V or so. Likewise, when the black surface of the display substrate 26 is to display white, no white display is carried out until the potential difference is −40 V or so.

Thus, from the experiments in which voltages were applied to a combination of the image display medium 12 with particles, it has been comprehended that the VT at which the particles start to be moved is 40 V.

In the image display medium 12, the voltage at which a sufficient display density is obtained (the voltage at which the reflectivity contrast ratio between black and white is over 10 (reflection density in black display state—reflection density in white display state ≧1; measured by use of the reflection densitometer 404 manufactured by X-Rite Co.)) is ±120 V; and at over ±200 V or greater, the density is sufficiently saturated, and even if a voltage exceeding it is applied, no change occurs. Thus it can be determined that, when a voltage of 200 V or greater is applied, substantially all the particles are moved. Therefore, at the time of detection, it is necessary to apply a test voltage over 200 V. However, it is expected that, as the quantity of charge of the particles is changed, a higher field strength is required for the particles to be moved. Therefore, it is desirable to apply a test voltage of ±300 V or higher, and more desirably of ±400 V or higher.

However, depending upon the type of the particles and the configuration of the substrate, the VT for the particles varies. Thus, the test voltage to be applied at the time of detection should exceed the voltage at which the density is sufficiently saturated, and may be a voltage 1.5 times higher than that voltage, and may be a voltage 2 times higher.

On the other hand, application of too high a voltage might impose an overload on the power supply and break the insulation resistance of the circuit. Therefore, a maximum voltage that is suitable for application is 600 V, and it can be considered to be more preferable to suppress the maximum voltage to 500 V or so.

Figure 4:
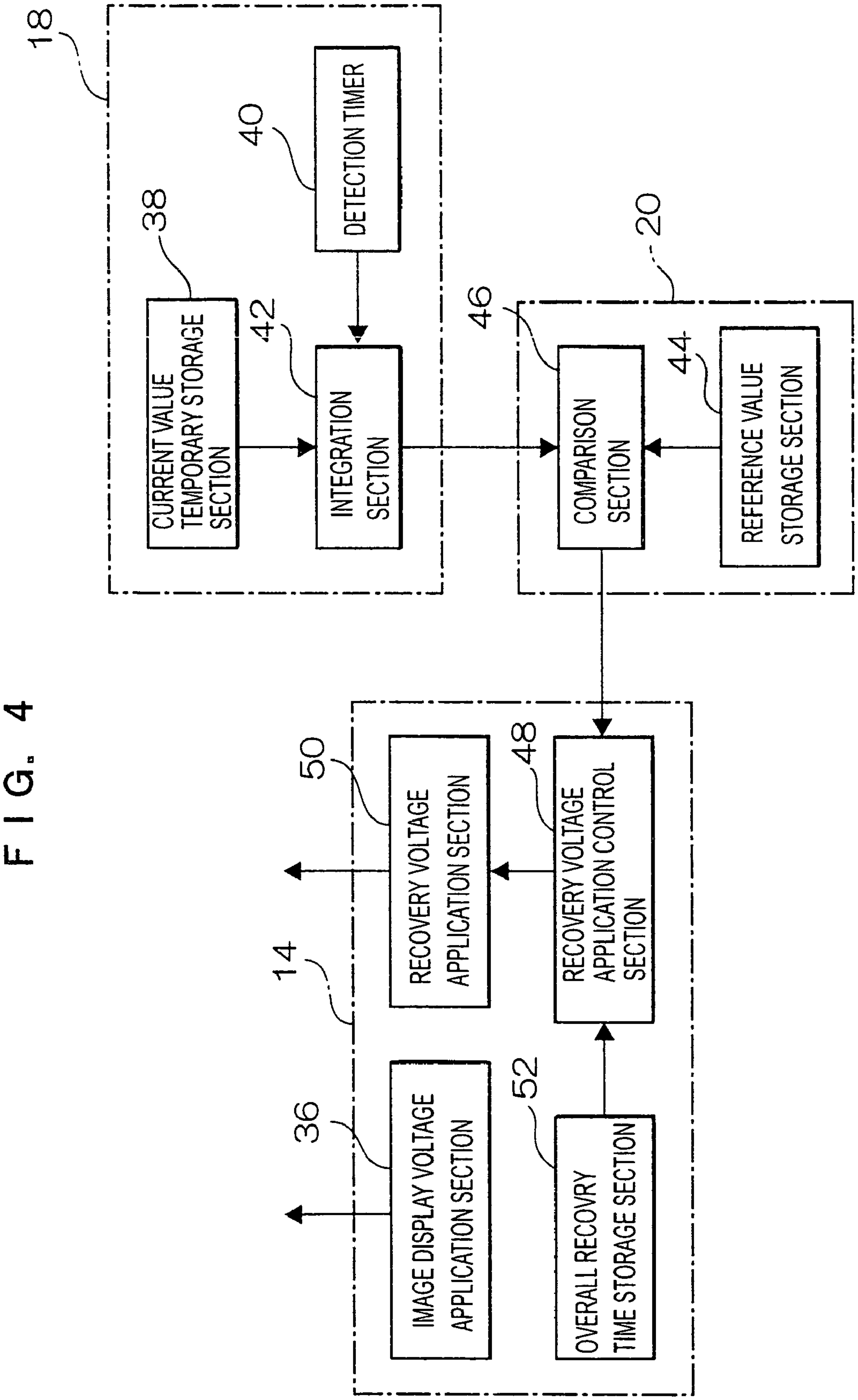
FIG. 4 is a functional configuration drawing of the critical part of the image display apparatus pertaining to the first embodiment.

Shown in FIG. 4, the detection circuit 18 comprises a current value temporary storage section 38 which temporarily stores the current detected by the detection circuit 18 when the test voltage is applied, and a detection timer 40 which counts the elapsed time.

In addition, the detection circuit 18 comprises an integration section 42 which is connected to the current value temporary storage section 38 and the detection timer 40. The integration section 42 determines the integrated value on the basis of the current value which is temporarily stored by the current value temporary storage section 38 and the elapsed time counted by the detection timer 40, as expressed by the following equation (5).

$$\text{Integrated value} = \sum_j I_j t_j \tag{5}$$

where

Ij: current value at a certain time tj: a certain time and summing up for j is carried out.

The control section 20 comprises a reference value storage section 44 which stores the reference value for the integrated value, and a comparison section 46 which is connected to the reference value storage section 44 and the integration section 42. The comparison section 46 compares the integrated value stored by the integration section 42 with the reference value stored by the reference value storage section 44.

The comparison section 46 is connected to a recovery voltage application control section 48. When, in the above-mentioned comparison processing, the integrated value is under the reference value, the comparison section 46 outputs the integrated value to the recovery voltage application control section 48. On the basis of the integrated value inputted from the comparison section 46, the recovery voltage application control section 48 controls the recovery voltage application section 50 for controlling the recovery voltage to be applied.

In addition, the recovery voltage application control section 48 is connected to an overall recovery time storage section 52. In the overall recovery time storage section 52, the amount of time until the quantity of charge of the particles exceeds the prescribed quantity of charge, in other words, the amount of time during which the application of the recovery voltage causes the integrated value to coincide with the reference value (hereinafter called the "recovery time") is predetermined and stored. The recovery voltage application section 50 applies the recovery voltage until the recovery time expires, under the control by the recovery voltage application control section 48.

The recovery voltage which is applied by the recovery voltage application section 50 is an alternating voltage, and the parameters including the application time, the peak voltage, the waveform, and the frequency are adjusted.

In addition, the recovery voltage includes a voltage which renders the arrangement of the particles uniform when applied.

Herein, how to determine the recovery time which is to be stored in the overall recovery time storage section 52 will be described.

Figure 7:
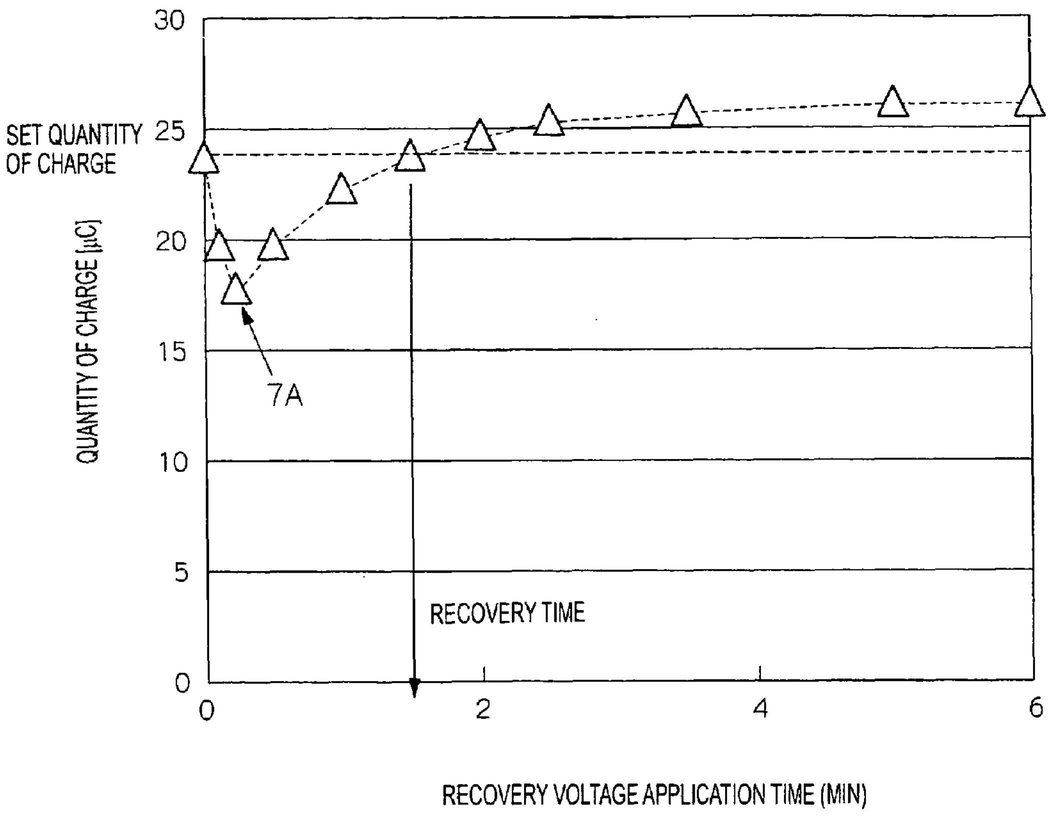
FIG. 7 is a graph illustrating the application time for the recovery voltage.

As a result of experimentation, it has been found that the quantity of charge of the image display medium 12 when the alternating voltage is applied is changed by a characteristic such that the quantity of charge is temporarily lowered shown in FIG. 7. The degradation of the contrast when the alternating voltage is applied occurs at the same timing as that of the temporary lowering of the quantity of charge shown with an arrow 7A in FIG. 7. The cause for this can be considered to be that the aggregation of the particles caused by the charging, the charge transfer from the contact portion, and the like, temporarily reduces the quantity of charge possessed by the particles.

The change shown in FIG. 7 is a result obtained by an experiment which was conducted by using an image display medium 12 with a display substrate 26 of 300 mm by 420 mm to which a voltage for initialization was applied and the ordinary image display voltage was applied, and then which was then left for one day.

Herein, the change in quantity of charge for the time when a recovery voltage with a peak-to-peak value of 200 V, and a frequency of 400 Hz was applied was measured. The quantity of charge is measured by the above-mentioned integration section 42 shown in FIG. 4 (herein, the quantity of charge is a physical quantity which is identical to the above-mentioned integrated value).

Experiments have shown that the result of measurement varies depending upon the conditions, such as the initial quantity of particles filled, the repetitive display frequency, the time period of standing with no display, the environmental temperature, and the like. However, the result of measurement shown in FIG. 7 is the result under the conditions which take the longest time period for recovery, and the time period required for recovery to the initial state is 1 min 30 sec.

In the related art as well, by carrying out voltage application once a day for 15 sec, for example, in order to provide display refreshing, and recovery, a sufficient display contrast could have been maintained.

However, supposing, for example, that, after leaving the system for one month with the drive power supply driving turned off for some reason, the same driving for display refreshing, and recovery as mentioned above is carried out. In some cases, the quantity of charge is degraded shown with the arrow 7A in FIG. 7, resulting in the display quality being lowered.

In the first embodiment, in order to prevent the display quality from being lowered due to the degradation of the quantity of charge shown with the arrow 7A in FIG. 7, the recovery time corresponding to the state in which the degradation most occurs is previously measured, (for example, the time is 1 min 30 sec in case of the experiment), and the recovery time is stored in the overall recovery time storage section 52.

In the event that several conditions, such as the power being shut off over a long period of time and the like, which require the recovery are present, the operation mode is switched over from the overwrite mode to the recovery mode in which the recovery processing is carried out.

Next, the function of the image display apparatus 10 pertaining to the first embodiment will be described.

Figure 8:
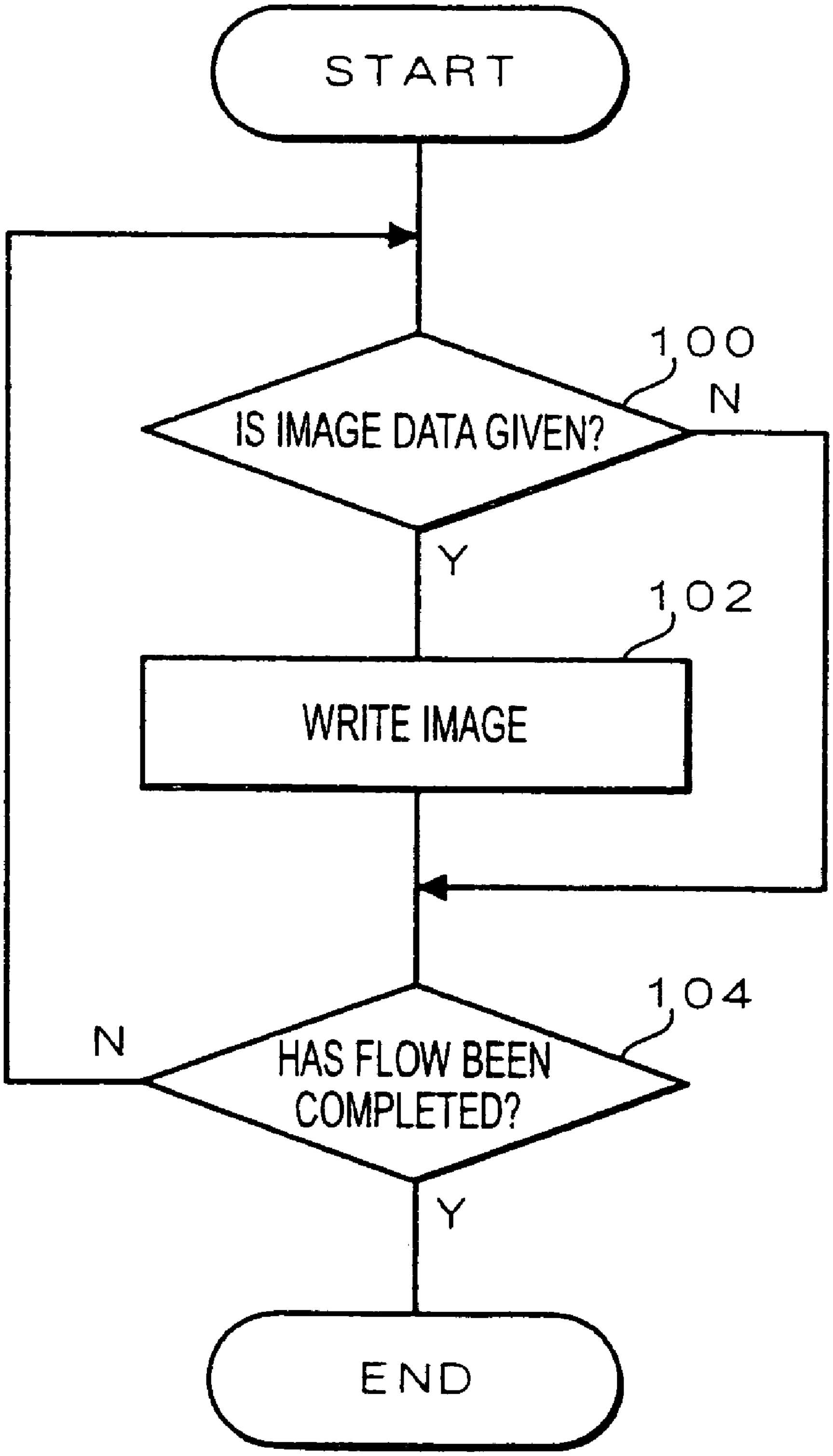
FIG. 8 is a flowchart for image overwriting pertaining to the first embodiment.

First, with reference to the flowchart shown in FIG. 8, the flow for image overwrite will be described.

At step 100, whether image data is present is determined. When image data is present and the determination is affirmative, the process proceeds to step 102, and when, at the step 100, the determination is negative, the process proceeds to step 104.

At step 102, the image which is to be displayed on the image display medium 12 is written.

At step 104, whether the flow has been completed is determined. When the flow has been completed, and the determination is affirmative, the flow is ended. When the determination is negative at step 104, the process is returned to step 100.

Figure 9:
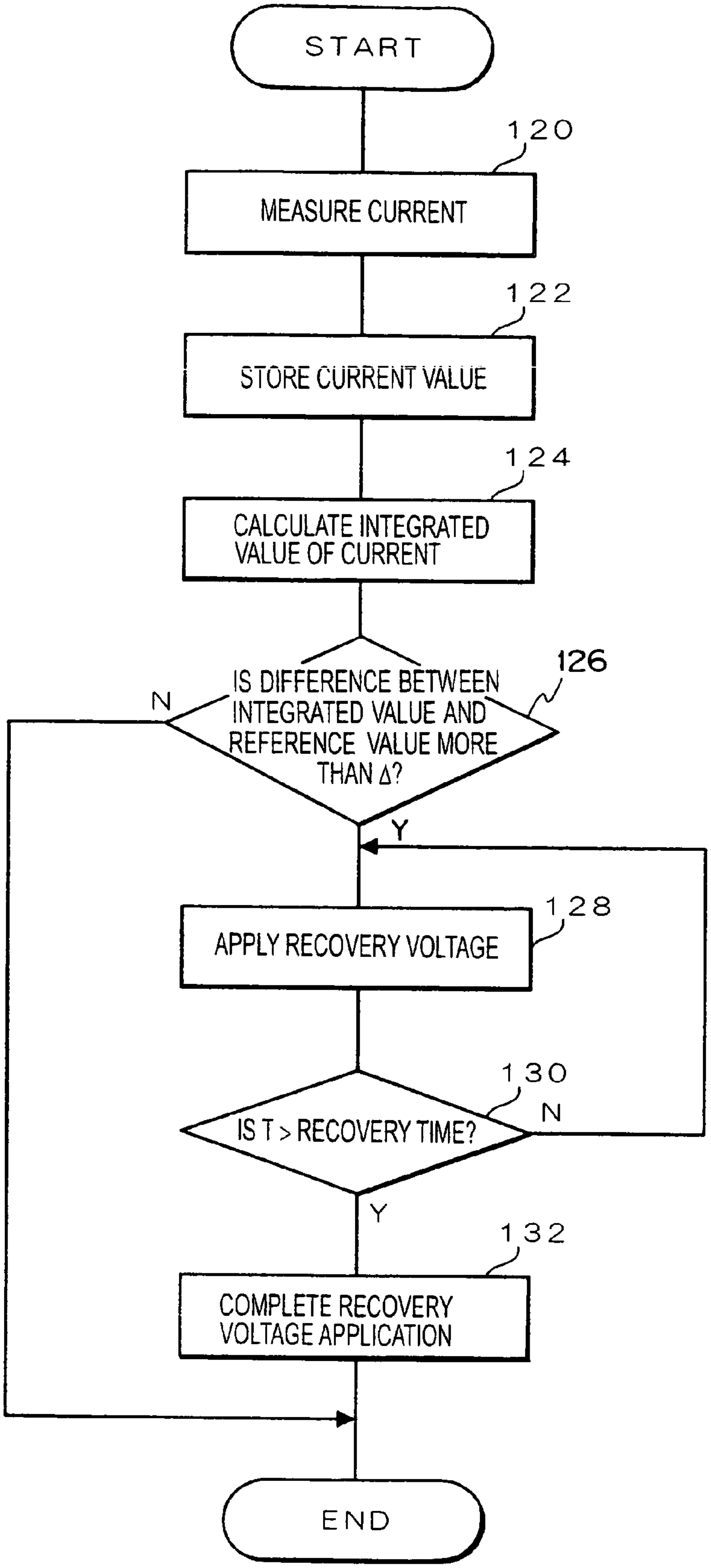
FIG. 9 is a flowchart for recovery processing pertaining to the first embodiment.

Next, the function of the part related to the capability of recovering from the lowered display function, such as lowered contrast, or the like, will be described in detail with reference to the flowchart shown in FIG. 9.

First, at step 120, on the basis of the detection by the detection circuit 18, the current value is measured.

At step 122, the current value measured after a certain time is stored. The current value is stored each time the certain time elapses, and the stored values are accumulated.

Next, at step 124, the integration section 42 calculates the integrated value of the current in accordance with the above-mentioned equation (5).

Next, at step 126, the comparison section 46 compares the integrated value with the reference value stored in the reference value storage section 44, and whether the integrated value is smaller and differs by more than the prescribed difference (hereinafter referred to as Δ) is determined. When the integrated value differs by more than Δ, and the determination is affirmative (for example, when, with Δ being 3 nC, and the reference value 24 being nC, the integrated value is under 21 nC), the process proceeds to step 128, and when the determination is negative at step 126, the flow is ended.

At step 128, the recovery voltage application control section 48 controls the recovery voltage application section 50 to apply the recovery voltage.

Next, at step 130, whether the recovery voltage application time exceeds the stored recovery time in the overall recovery time storage section 52 is determined. When the recovery voltage application time exceeds the recovery time stored, and the determination is affirmative, the process proceeds to step 132, and when the determination is negative at step 130, the process proceeds to step 128.

At step 132, the recovery voltage application control section 48 controls the recovery voltage application section 50 to complete the application of the recovery voltage.

The flow may be automatically performed by, for example, a mechanism which starts the recovery mode at a predetermined timing in the operation sequence, such as the power-on time, or the like, or may be started according to instruction given by the user.

In addition, in the first embodiment, for detection of the quantity of state which quantitatively expresses the state of the particles 28, 30, the current is detected, and the integrated value (the quantity of charge) is determined. However, for detection of the quantity of state, the display density of the image on the display substrate 26 side, or an environmental quantity, such as the temperature, the humidity, the atmospheric pressure, or the like, for example, may be detected, instead of the current. For example, when the temperature is to be detected, the image display apparatus 10 may detect the environmental operating temperature, and when 30° C., which is set as the reference value is exceeded, it may enter the recovery mode. Likewise, for detection of the quantity of state, the humidity, the atmospheric pressure, or the like may be detected.

Thus, in the first embodiment, by applying the recovery voltage until the predetermined prescribed recovery time expires, degradation of the display function due to operation over a long period of time can be prevented, and shortening of the service life of the image display apparatus being shortened can also be prevented.

Second Embodiment

Figure 10:
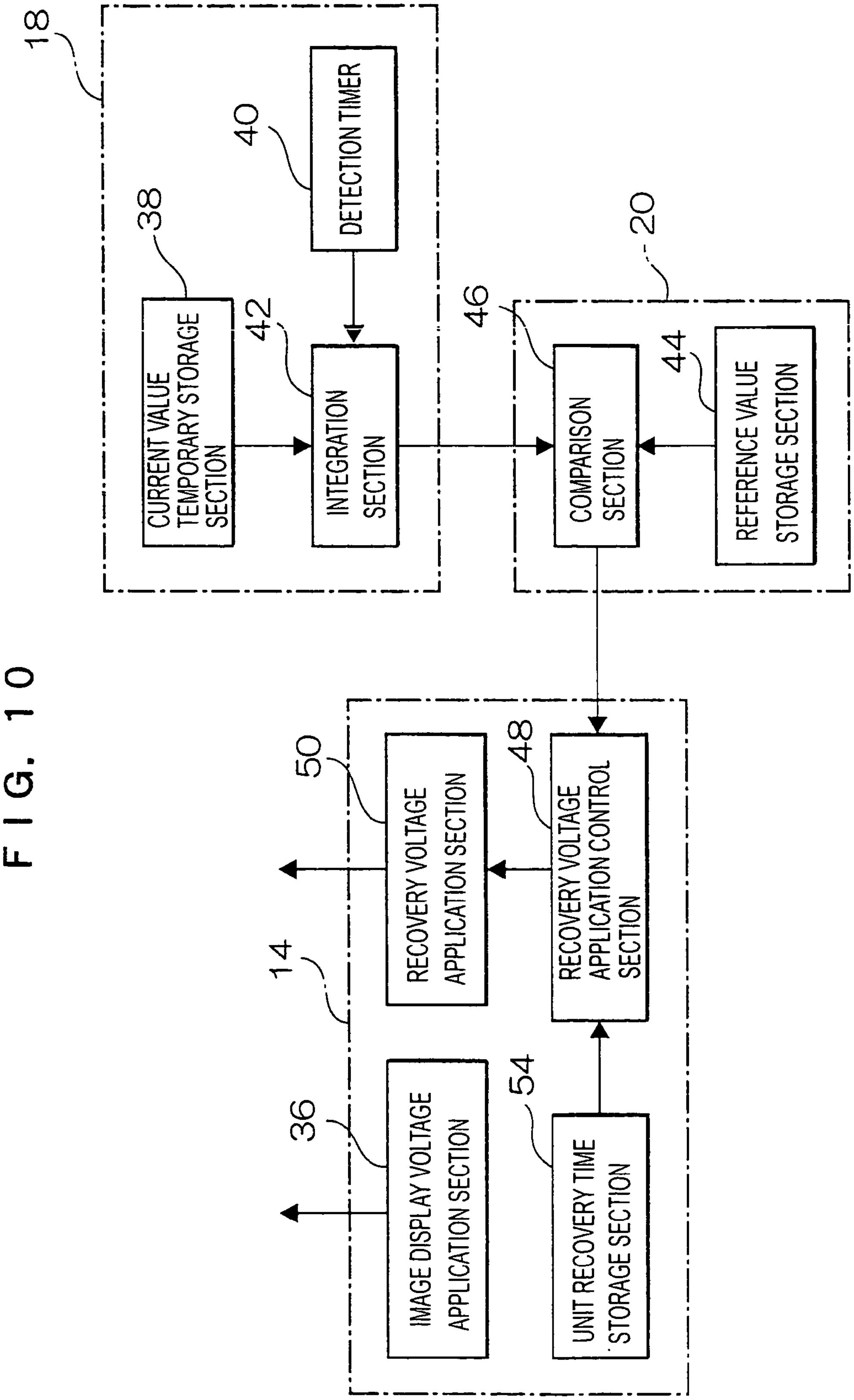
FIG. 10 is a functional configuration drawing of the critical part of the image display apparatus pertaining to a second embodiment.

Hereinbelow, a second embodiment of the present invention will be described. In this second embodiment, the same components as those in the first embodiment will be provided with the same reference numerals, and description of the components will be omitted. The second embodiment is characterized in that, even before the set recovery time expires in the recovery mode, the quantity of charge is measured to determine whether the quantity of charge has recovered to the setting, and the recovery voltage is repetitively applied until the quantity of charge of the particles reaches the prescribed quantity which is predetermined. As shown in FIG. 10, the image display apparatus 10 of the second embodiment comprises a unit recovery time storage section 54 which stores a unit recovery time obtained by dividing the recovery time into prescribed time amounts. In the second embodiment, the recovery voltage application control section 48 controls the recovery voltage application section 50 such that it applies the recovery voltage to the row electrodes 30A and the column electrodes 30B for the unit recovery time stored by the unit recovery time storage section 54.

Next, the function of the part related to the second embodiment will be described in detail with reference to the flowcharts shown in FIG. 11 and FIG. 12.

Figure 11:
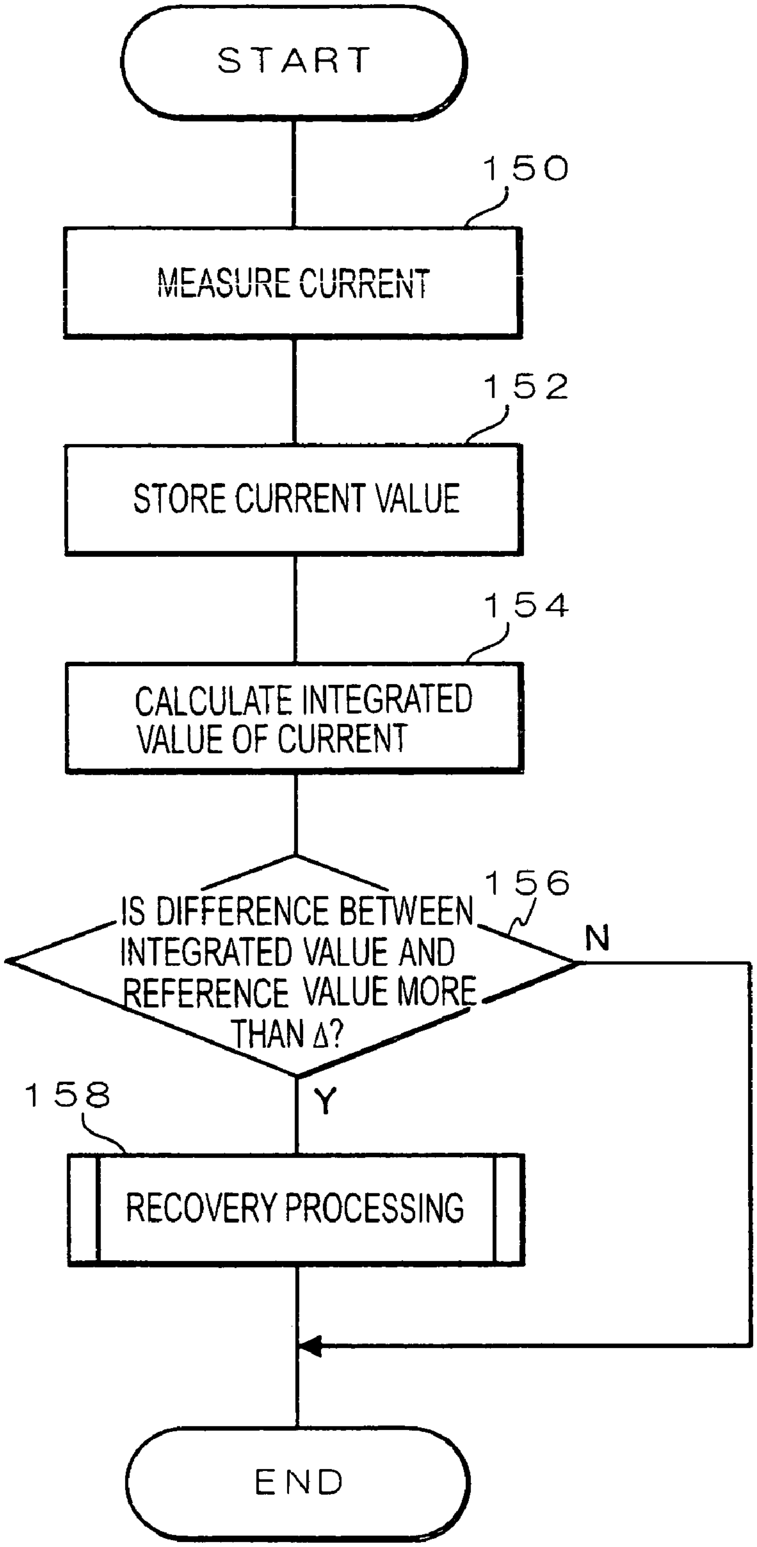
FIG. 11 is a flowchart for the outline of recovery processing pertaining to the second embodiment.

Shown in FIG. 11, first, at step 150, on the basis of the detection by the detection circuit 18, the current value is measured.

At step 152, the current value measured after a certain time is stored. The current value is stored each time the certain time elapses, and the stored values are accumulated.

Next, at step 154, the integration section 42 calculates the integrated value of the current in accordance with the above-mentioned equation (5).

Next, at step 156, the comparison section 46 compares the integrated value with the reference value stored in the reference value storage section 44, and whether the integrated value is smaller and differs by more than the prescribed difference (hereinafter referred to as Δ) is determined. When the integrated value differs by more than Δ, and the determination is affirmative, the process proceeds to step 158, and when, at the step 156, the determination is negative, the flow is ended.

Figure 12:
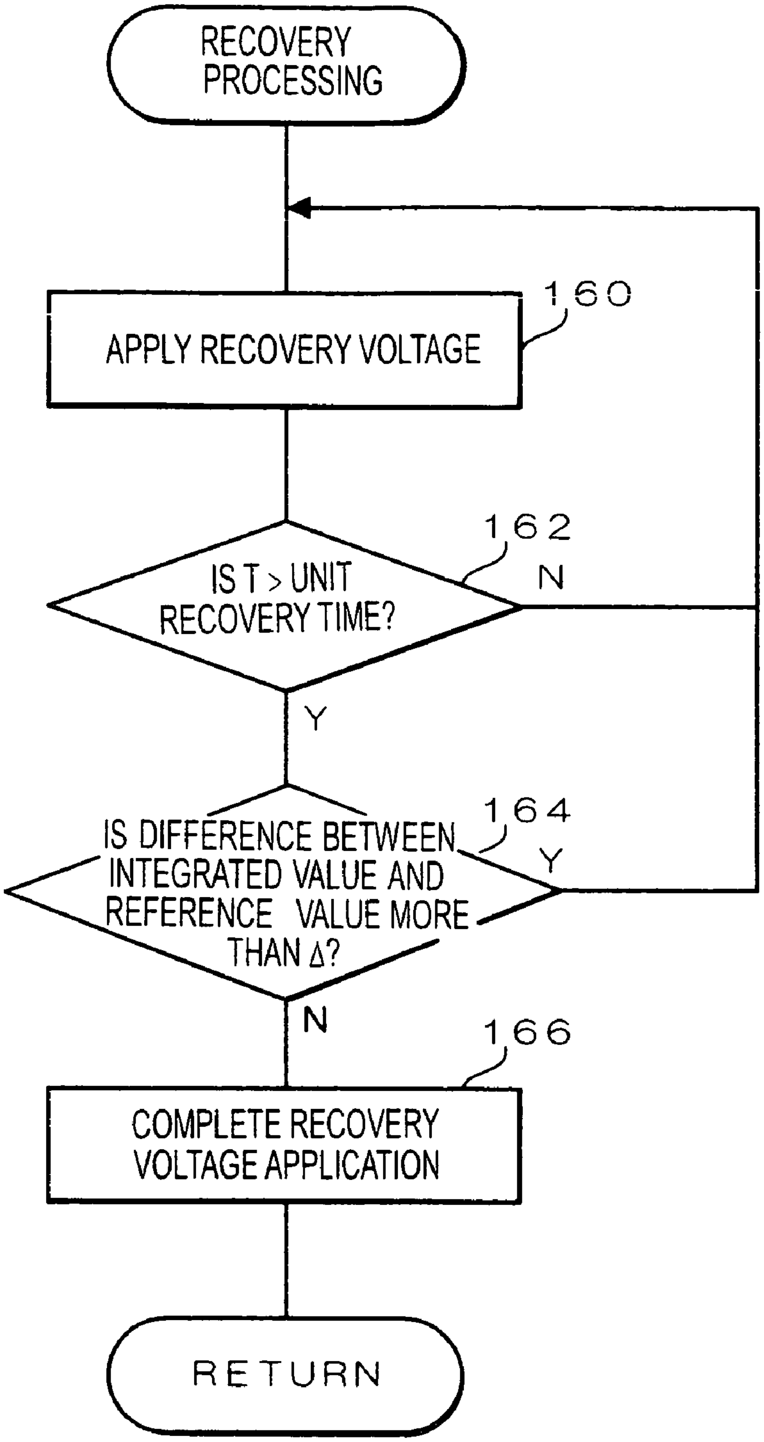
FIG. 12 is a flowchart for recovery processing pertaining to the second embodiment.

At step 158, the recovery processing described later with reference to FIG. 12 is carried out.

Shown in FIG. 12, in the recovery processing, first, at step 160, the recovery voltage application control section 48 controls the recovery voltage application section 50 to apply the recovery voltage.

Next, at step 162, whether the recovery voltage application time exceeds the unit recovery time is determined. When the recovery voltage application time exceeds the prescribed time, and the determination is affirmative, the process proceeds to step 164, and when the determination is negative at step 162, the process proceeds to step 160.

Next, at step 164, the comparison section 46 compares the integrated value with the reference value stored in the reference value storage section 44, and whether the integrated value is smaller and differs by more than the prescribed difference (hereinafter referred to as Δ) is determined. When the integrated value differs by greater than Δ, and the determination is affirmative, the process proceeds to step 160, and when the determination is negative at step 164, the process proceeds to step 166.

At step 166, the recovery voltage application control section 48 controls the recovery voltage application section 50 to complete the application of the recovery voltage.

Thus, in the second embodiment, degradation of the display function due to operation over a long period of time can be prevented; shortening of the service life of the image display apparatus can also be prevented; and further, even before the prescribed recovery time which is predetermined expires in the recovery mode, the system can come out of the recovery mode, which allows the time and power required for the recovery to be economized.

In the first embodiment, and the second embodiment, a voltmeter is used. However, a configuration in which the current is directly measured with an ammeter may be adopted. In this case, there is no need for measuring the resistance value, which allows a more convenient configuration, with the need for measuring the voltage being eliminated. In addition, a configuration in which the power is measured may be adopted.

EXAMPLES

Hereinbelow, the results of experiments conducted for examining the characteristics of recovery for different types of particle are described.

Particle A (1) White Particle-1 a) Preparation of Dispersion A1

For a mixture having a composition shown in Table 2 below, ball mill pulverization using 10-mm-diameter zirconia balls is carried out for 20 hrs to obtain a dispersion A1.

TABLE 2

| | |
|---|---|
| Styrene monomer | 53 parts by weight |
| Titanium oxide (TAIPEKU CR63, manufactured by Ishihara Sangyo Kaisha, Ltd.) | 45 parts by weight |
| Charge control agent (COPY CHARGE PSYVP20 38, manufactured by Clariant Japan KK) | 2 parts by weight |

b) Preparation of Calcium Carbonate Dispersion B

For a mixture having a composition shown in Table 3 below, ball mill pulverization is carried out in the same manner as in the preparation of the dispersion A1 to obtain a calcium carbonate dispersion B.

TABLE 3

| | |
|---|---|
| Calcium carbonate | 40 parts by weight |
| Water | 60 parts by weight |

C) Preparation of Mixture C

For a mixture having a composition shown in Table 4 below, an ultrasonic disperser is used to carry out deaeration for 10 min, and then an emulsifier is used for stirring to obtain a mixture C.

TABLE 4

| | |
|---|---|
| 2% aqueous solution of CMC (CELLOGEN, manufactured by Daiichi Kogyo Seiyaku, Co., Ltd.) | 4.3 g |
| Calcium carbonate dispersion B | 8.5 g |
| 20% saline solution | 50 g |

d) Manufacture of Particles

The constituents shown in Table 5 below are measured and thoroughly mixed, then an ultrasonic disperser is used to carry out deaeration for 10 min. The solution is then added into the mixture C, and an emulsifier is used to carry out emulsification.

TABLE 5

| | |
|---|---|
| Dispersion A1 | 35 g |
| Divinylbenzene | 1 g |
| Polymerization initiator AIBN (azobisisobutyronitrile) | 0.35 g |

Next, this emulsion is placed in a bottle, the bottle is stopped with a silicone stopper, and reduced-pressure deaeration is thoroughly performed, which is followed by introducing nitrogen gas into the bottle and sealing it.

Then, reaction is carried out for 10 hr at 70° C. for manufacture of particles.

After cooling, the manufactured particles are taken out, and by using an excessive amount of 3 mol/l hydrochloric acid, the calcium carbonate is decomposed, followed by filtering.

Thereafter, the particles are washed with a sufficient amount of distilled water; using a nylon sieve having openings of 20 μm, and that with openings of 25 μm, the particles which penetrate through the 25-μm nylon sieve but do not penetrate through the 20-μm nylon sieve are gathered; the grain size is rendered uniform; and the particles are dried for manufacture of white particles-1 having a volume-average particle diameter of 23 μm.

(2) Blue Particle-1

In the procedure for manufacturing of white particles-1 as described above, the following process of "d) Preparation of dispersion A2" is substituted for the process of "a) Preparation of dispersion A1" and using the obtained dispersion A2, the subsequent processes in the procedure for manufacturing of white particles-1 are carried out for manufacture of blue particles-1.

d) Preparation of Dispersion A2

For a mixture having a composition as given in Table 6 below, ball mill pulverization using 10-mm-diameter zirconia balls is carried out for 20 hrs to obtain a dispersion, A2.

TABLE 6

| | |
|---|---|
| Styrene monomer | 87 parts by weight |
| Blue pigment (Pigment Blue 15:3 SANYO CYANINE BLUE KRO, manufactured by SANYO COLOR WORKS, LTD.) | 10 parts by weight |
| Charge control agent (BONTRONE-84, manufactured by Orient Chemical Corporation) | 2 parts by weight |

The above-mentioned white particles-1 and the blue particles-1 are mixed in a weight ratio of 1 to 1 in order to produce particles A.

Particle B

The black particles 32 used are spherical black particles of carbon-containing crosslinked polymethylmethacrylate (TECHNOPOLYMER-MBX-black, manufactured by Sekisui Plastics Co., Ltd.) and which are a volume-average particle diameter of 20 μm, being mixed with fine powder of AEROSIL A130 treated with aminopropyltrimethoxysilane at a rate of 100 to 0.2 in weight ratio, and the white particles 34 used are spherical white particles of titanium oxide-containing crosslinked polymethylmethacrylate (TECHNOPOLYMER-MBX-white, manufactured by Sekisui Plastics Co., Ltd.) and which are a volume-average particle diameter of 20 μm, and which are mixed with fine powder of titania treated with isopropyltrimethoxysilane at a rate of 100 to 0.1 in weight ratio. The spherical black particles and the spherical white particles are mixed at a rate of 1 to 1 in weight ratio for use.

In this case, the black particles and the white particles were friction-charged. By using the charge spectrograph method for measurement of the charge, it was found that the black particles were charged, having a distribution centered around approximately 12 fC, and the white particles were charged, having a distribution around approximately −12 fC. In other words, the black particles and the white particles were positively and negatively charged, respectively. These mixed particles are hereinafter referred to as the particles B.

The above-mentioned particles A and particles B were used to conduct tests such as described below.

A substrate, a test piece on which a 20-mm-square space is partitioned, a back substrate with which an acrylic resin spacer (a test area of 20 mm by 20 mm) having a height of 200 μm is formed on a 50 mm by 50 mm copper-clad glass-epoxy substrate, and a 50 mm by 50 mm glass-ITO front substrate are prepared. Each of these a solid electrode. Further a polycarbonate resin is coated onto these as an insulating layer.

A weight of 8.3 mg of the black and white mixed particles are sieved substantially uniformly into the test area on the back substrate through a stainless steel screen, which is then followed by placing the glass-ITO display substrate 26 thereon, and fixing the circumference with a UV-curing adhesive.

A power supply and an ampere meter were connected between the front substrate and the back substrate; a voltage was applied for initialization; the same waveform display drive as that in the ordinary particle display was carried out, which was followed by leaving the system for one day; and then the relationship between the period of time during which a peak-to-peak voltage of 200 V at a frequency of 400 Hz is applied, and the quantity of charge at this time was determined.

Figure 13:
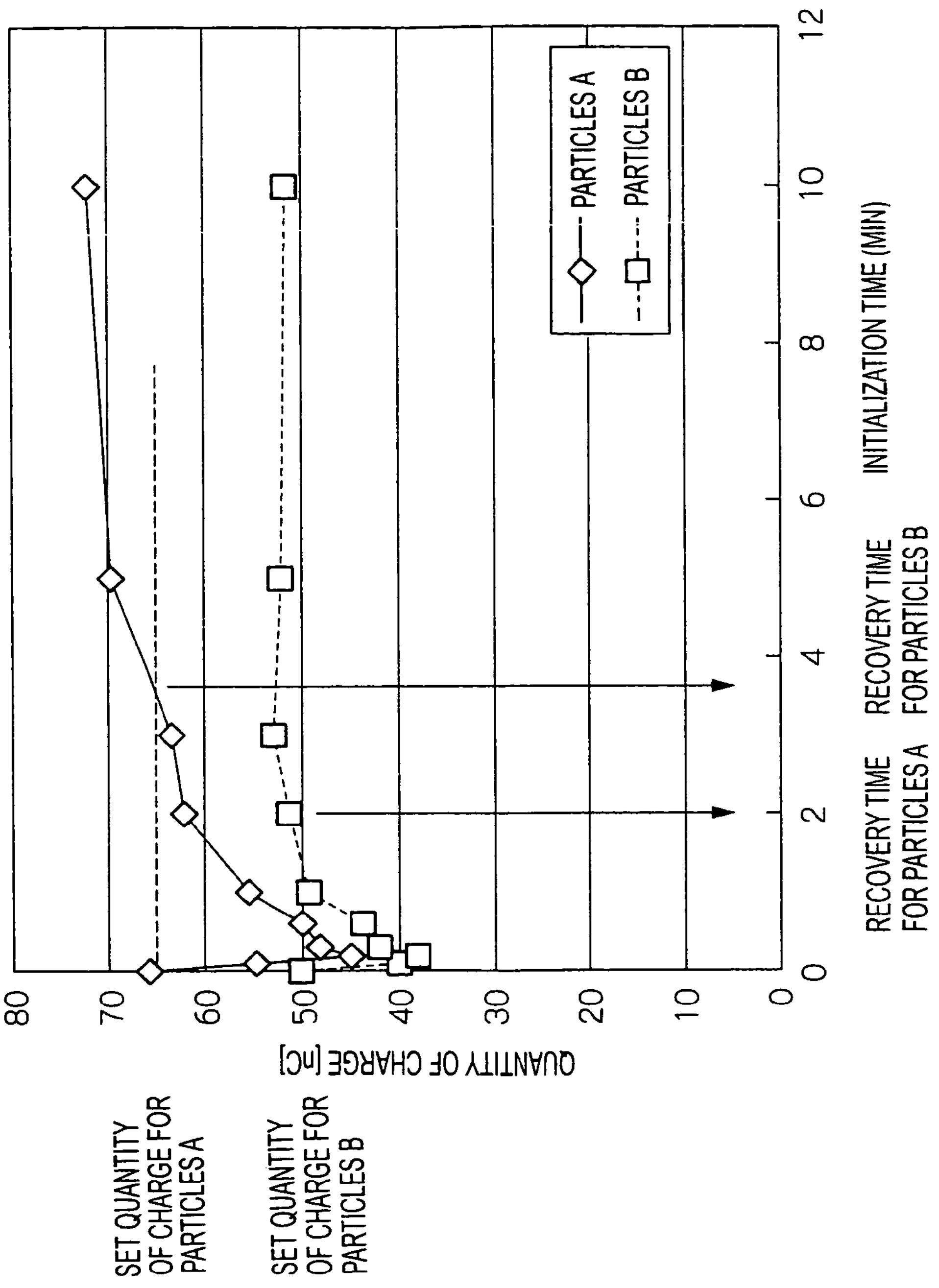
FIG. 13 is a graph illustrating different second voltage application times for different types of particle in the Examples.

Shown in FIG. 13, with the particles A, a result was obtained that, after the quantity of charge had been reduced, the initial state was recovered in 3 min 30 sec. With the particles B, a result was obtained such that the initial state was recovered in 2 mm.

The cause for the above-mentioned phenomenon can be considered to be that the charged state of the nonconductive particles is influenced by water vapor in the air, the monomer components contained in the particles themselves and the material resin constituting the substrate, and the like, which may result in the occurrence of a state in which electric charge can be easily given and taken. Thus, at the initial stage when the particles contact one another, positive and negative charges encounter each other and disappear, resulting in the quantity of charge of the particles being temporarily lowered, and thereafter, the number of times of contact between particles is increased, and the effect of the friction causes the contacted particles to be charged, whereby the total quantity of charge possessed by the particles as a whole is increased.

In addition, it was found to be suitable that the recovery voltage is applied for 10 sec to 10 min, and is a rectangular wave which has a frequency of 20 Hz to 20 kHz, may be of 50 Hz to 10 kHz, and still may be of 100 Hz to 3 kHz, and a voltage of 200 V to 600 V. Further, in order to detect the quantity of charge, it is preferable to apply an inclined wave voltage.

As can be seen from the above description, the present invention can prevent the display function from being degraded due to operation over a long period of time, and can also prevent the service life of the image display apparatus from being shortened.

Example 1

The image display apparatus of the present invention is manufactured as follows.

The display substrate 26 is manufactured by sputtering an ITO film onto a front substrate member made of transparent glass 1.1 mm thick; etching this in a prescribed pattern to form a plurality of column electrodes 30B; dip coating onto these column electrodes 30B, a solution dissolving 3 parts by weight of a polycarbonate resin for 97 parts by weight of toluene; and thereafter, drying the coating to form an insulating film made of a polycarbonate film 2 μm thick.

The back substrate 28 is manufactured by cladding a copper film on a back substrate 28 member made of a glass-epoxy resin substrate 0.2 mm thick; etching this in a prescribed pattern to form a plurality of row electrodes 30A; dying the surface black by an oxidation treatment; laminating a dry film such that the height is 150 μm; thereafter, using photolithography for processing the portion to be left as a spacer such that the width is 75 μm, and the geometry of a cell to be surrounded by the spacer is 1 by 4 mm; thereafter, dip coating onto the row electrodes 30A, a solution dissolving 3 parts by weight of a polycarbonate resin for 97 parts by weight of toluene; drying the coating to form a dielectric film made up of a polycarbonate film 2 μm thick; further, printing onto the spacer, a thermoplastic adhesive with a stainless steel mesh printing screen; and drying it at 150° C. for 30 min.

The above-mentioned particles B are sieved into the recess part sectioned by the spacer on the back substrate 28 through a stainless steel screen. The white particles 34 and the black particles 32 adhered to the top surface of the spacer are removed by using a blade made of silicone rubber. The display substrate 26 is positioned in a prescribed position for registration, and subjected to heating at 100° C. for joining by thermocompression bonding.

The image display apparatus 10 was manufactured by connecting a flexible printed wiring board to the column electrodes 30B on the display substrate 26, and the row electrodes 30A on the back substrate 28, respectively, by thermocompression bonding for electrical connection to the corresponding column drive circuit 16B, and row drive circuit 16A; thereafter, initially applying an initialization voltage of ±200 V and 400 Hz to each of the column electrodes 30B and the row electrodes 30A, continuously for 5 min for causing the particles to be sufficiently friction-charged and uniformly distributed on the display substrate 26 surface. The initial quantity of charge for the image display apparatus 10 was measured to find that the quantity of charge was 25 nC, and the recovery time was 1 min 30 sec. As the reference values, the initial quantity of charge was specified to be 24 nC, with the above-mentioned prescribed difference (Δ) to be 3 nC, and the system was set such that, when the quantity of charge becomes 21 nC, the recovery voltage is applied, and the voltage application is terminated at the recovery time of 1 min 30 sec.

To this image display apparatus 10, image data was inputted to cause it to display a repetitive image at a frequency of once an hour for detecting the quantity of charge every one hour, and comparing it with the reference value. As a result of this, on the third day from the start, the set recovery operation was performed to recover the quantity of charge to the initial state. Further, repeating the display of the image was continued over three months to find that the recovery operation was executed at time intervals of approximately 3 days. The display state was continued to be observed over this period of time to find that there occurred no great change in contrast, with a good display state being maintained.

Comparative Examples

For comparison, except for that the quantity of charge was not detected, and that every time the image is written at a frequency of once an hour, the recovery voltage is applied for 10 sec, the same image display apparatus 10 as in the above-described EXAMPLE 1 was used to observe the display image to find that, from the tenth day, the lowering in contrast started to become noticeable, and on the twentieth day, the lowering in black density became partially remarkable, resulting in the image being rendered hard to view. The cause for this state is insufficient recovery operation, and application of the recovery voltage for a period of time exceeding the recovery time to this image display apparatus 10 resulted in the display state being returned to the initial state.

In addition, for further comparison, except for that the quantity of charge was not detected, and that the recovery operation was performed once a day for 2 min, the same image display apparatus 10 as in the above-described EXAMPLE 1 was used to observe the display image to find that, in one month, fogging of the white background of the display image (an increase in white density) started to be recognized, resulting in the contrast between black and white densities being lowered. To this image display apparatus 10, the same recovery voltage as in the above-described comparative example was applied, but the display state was not sufficiently recovered to the initial state. The cause for this can be considered to be that, because of the repetition of an excessive recovery operation, the charging performance of the particles was degraded.

Example 2

EXAMPLE 2 is an example of the second embodiment. In the present EXAMPLE 2, except for that the recovery processing flow shown in FIG. 12 is performed, the same image display apparatus 10 as in EXAMPLE 1 was manufactured.

In this image display apparatus 10, the unit recovery time was set at 20 sec, and image data was inputted at a frequency of once an hour to cause a repetitive image to be displayed for detecting the quantity of charge every one hour and comparing it with the reference value. As a result of this, on the third day from the start, the recovery operation was performed for 1 min (the unit recovery time multiplied by 3 times) to recover the quantity of charge to the initial state. Further, repeating the display of the image was continued over three months to find that the recovery operation was executed at time intervals of approximately 3 days, the recovery operation being performed for 1 min to 1 min 40 sec (the unit recovery time multiplied by 3 times to 5 times). The display state was continued to be observed over this period of time to find that there occurred no great change in contrast, with a good display state being maintained. In addition, compared to EXAMPLE 1, EXAMPLE 2 required less total power for the recovery, and provided an image display apparatus consuming less energy.

Because the ending section ends the recovery by the recovery section when the quantity of charge of the particles has reached a prescribed quantity, imposition of an unnecessary load upon the image display apparatus itself can be prevented.

Therefore, in the apparatus of this first aspect, degradation of the display function due to the operation over a long period of time can be prevented, and shortening of the service life of the image display apparatus can also be prevented.

In addition, in the apparatus of this first aspect, the time when the quantity of charge of the particles has reached a prescribed quantity may be the time when the processing for the recovery has been carried out for a predetermined period of recovery time, and the period of recovery time may be determined according to image display operation conditions.

Further, in the apparatus of this first aspect, the recovery may be a recovery operation for a prescribed period of unit time that is repeated until the quantity of charge of the particles reaches a prescribed quantity.

In addition, in the apparatus of this first aspect, the recovery section may be a recovery voltage application section which applies a recovery voltage to the particles. Further, in the apparatus of this first aspect, the recovery voltage may be an alternating voltage; an adjustment section which adjusts at least any one of the application time, the peak voltage, the waveform or the frequency of the alternating voltage may be further included; and the recovery voltage may include a voltage which renders the arrangement of the particles on the transparent electrode side uniform.

Application of an alternating voltage between the electrodes causes easy-to-move particles to be reciprocated between the electrodes, and these particles collide against difficult-to-move particles, which results in the difficult-to-move particles being released from the adherence to the electrode or that to adjacent particles, and becoming movable, and thus occurrence of an aggregate of particles can be prevented. In addition, even after an aggregate of particles has been produced, the particles which are not aggregated will make a reciprocating motion, while repetitively colliding against the aggregate, and thus can separate it.

In addition, in the apparatus of the first aspect, a detection section which detects a quantity of state which quantitatively expresses the state of the particles may be further included, and the adjustment section may adjust the alternating voltage according to the detection result, whereby the arrangement of the particles on the transparent electrode side is adjusted.

Further, in the apparatus of the first aspect, a storage section which stores a predetermined quantity of adjustment that corresponds to the quantity of state, and a comparison section which compares the quantity of state with the quantity of adjustment may be further included, and the recovery section may carry out the recovery on the basis of the comparison result.

In addition, in the apparatus of the first aspect, the quantity of state may include at least any one of the density of an image display on the transparent electrode side, the quantity of charge that is obtained by time-integrating the current value involved in the movement of the particles between the electrodes or an environmental quantity including at least any one of the temperature, the humidity or atmospheric pressure.

In the second aspect of invention, the predetermined period of time may be a period of time in which the quantity of charge of the particles reaches a prescribed quantity, and which is predetermined according to image display operation conditions.

Therefore, according to the second aspect of the present invention, as with the first aspect of invention, degradation of the display function due to operation over a long period of time can be prevented. Further, shortening of the service life of the image display apparatus can also be prevented.

Therefore, according to the third aspect of the present invention, as with the first aspect of invention, degradation of the display function due to the operation over a long period of time can be prevented, and shortening of the service life of the image display apparatus can also be prevented; and further, when the quantity of charge of the particles has reached a prescribed quantity, the recovery is ended, whereby the time and the power required until the recovery is achieved can be economized.

As described hereinabove, the present invention has excellent effects of providing an image display apparatus which can prevent the display function from being degraded due to the operation over a long period of time, and can also prevent the service life of the image display apparatus from being shortened, and an image display method carried out in the image display apparatus.

What is claimed is:

1. An image display apparatus which, on the basis of image data, applies a prescribed image display voltage between a pair of electrodes at least one of which is a transparent electrode, thereby moving particles consisting of both positively charged black particles and negatively charged white particles enclosed between the electrodes to carry out image display by the particles arranged on the transparent electrode side, the apparatus comprising:

- a recovery section which recovers a reduction in quantity of charge of the particles;
- a detection section which detects quantity of charge of the particles; and
- a control section which compares the detected quantity of charge with a prescribed reference quantity, causes the recovery section to initiate or to continue the recovery for a prescribed period of recovery time if the detected quantity of charge is less than the prescribed reference quantity, and causes the recovery section to terminate the recovery if, after a prescribed period of recovery time passes, the detected quantity of charge exceeds the prescribed reference quantity.

2. The image display apparatus of claim 1, wherein the time when the quantity of charge of the particles has reached a prescribed quantity is the time when the processing for the recovery has been carried out for the prescribed period of recovery time.

3. The image display apparatus of claim 2, wherein the prescribed period of recovery time is determined according to image display operation conditions.

4. The image display apparatus of claim 1, wherein the recovery is a recovery operation for a prescribed period of recovery time that is repeated until the quantity of charge of the particles reaches the prescribed reference quantity.

5. The image display apparatus of claim 1, wherein the recovery section is a recovery voltage application section which applies a recovery voltage to the particles.

6. The image display apparatus of claim 5, wherein the recovery voltage is an alternating voltage.

7. The image display apparatus of claim 6, further comprising an adjustment section which adjusts at least any one of the application time, the peak voltage, the waveform, or the frequency of the alternating voltage.

8. The image display apparatus of claim 5, wherein the recovery voltage includes a voltage which renders the arrangement of the particles on the transparent electrode side uniform.

9. An image display method in an image display apparatus which, on the basis of image data, applies a prescribed image display voltage between a pair of electrodes, at least one of which is a transparent electrode, thereby moving particles consisting of both positively charged black particles and negatively charged white particles enclosed between the electrodes to carry out image display by the particles arranged on the transparent electrode side, the method comprising:

recovering a reduction in quantity of charge of the particles;

detecting quantity of charge of the particles;

comparing the detected quantity of charge with a prescribed reference quantity;

causing the recovery section to initiate or to continue the recovery for a prescribed period of recovery time if the detected quantity of charge is less than the prescribed reference quantity; and causing the recovery section to terminate the recovery if, after a prescribed period of recovery time passes, the detected quantity of charge exceeds the prescribed reference quantity.

10. The image display method of claim 9, wherein the prescribed period of recovery time is a period of time in which the quantity of charge of the particles reaches a prescribed quantity, and which is predetermined according to image display operation conditions.

11. An image display method in an image display apparatus which, on the basis of image data, applies a prescribed image display voltage between a pair of electrodes, at least one of which is composed of a transparent electrode, thereby moving particles consisting of both positively charged black particles and negatively charged white particles enclosed between the electrodes to carry out image display by the particles arranged on the transparent electrode side, the method comprising:

recovering a reduction in quantity of charge of the particles;

comparing the detected quantity of charge with a prescribed reference quantity; and causing the recovery section to perform the recovery for a prescribed period of recovery time that is repeated until the detected quantity of charge exceeds the prescribed reference quantity.

12. The image display apparatus of claim 1, further comprising:

a power detection section; and a control section that determines whether or not to initiate the recovery when the power detection section detects that power is turned on, or when a user instructs the control section to determine whether or not to initiate the recovery.

13. The image display apparatus of claim 1, wherein, the detection section detects a quantity of state, the control section compares the quantity of state detected by the detection section with a prescribed reference quantity and causes the recovery section to initiate recovery based on the comparison result, and the quantity of state includes at least one of a density of an image display on the transparent electrode side, a quantity of charge that is obtained by time-integrating a current value involved in movement of the particles between the electrodes, a duration of time for which power has been turned off, or an environmental quantity including at least any one of temperature, humidity, or atmospheric pressure.

* * * * *